United States Patent [19]

Nichols

[11] Patent Number: 5,254,372
[45] Date of Patent: Oct. 19, 1993

[54] METHOD AND APPARATUS FOR PLASMA TREATMENT OF A FILAMENT

[75] Inventor: Michael F. Nichols, Columbia, Mo.

[73] Assignee: Nichols Technologies, Inc., Columbia, Mo.

[21] Appl. No.: 661,838

[22] Filed: Feb. 27, 1991

[51] Int. Cl.$^5$ .................. B05D 3/06; B05D 7/22; A01N 1/02

[52] U.S. Cl. ........................ 427/488; 427/2; 427/491; 427/535; 427/538; 427/539; 427/569; 427/237; 427/238

[58] Field of Search ............ 427/2, 39, 40, 41, 231, 427/238, 237, 488, 490, 491, 535, 536, 538, 539, 569

[56] References Cited

U.S. PATENT DOCUMENTS

| | | | |
|---|---|---|---|
| 3,313,269 | 4/1967 | Hough | 118/49.5 |
| 3,365,330 | 1/1968 | Hough | 117/201 |
| 3,409,469 | 11/1968 | Kuntz | 117/231 |
| 3,572,286 | 3/1971 | Forney | 118/49.5 |
| 3,738,314 | 6/1973 | Morelock | 118/49.5 |
| 3,780,255 | 12/1973 | Boom | 219/121 |
| 3,865,074 | 2/1975 | Cornelissen et al. | 118/49.5 |
| 3,892,892 | 7/1975 | Hofer | 427/272 |
| 3,895,135 | 7/1975 | Hofer | 427/248 |
| 4,072,769 | 2/1978 | Lidel | 427/38 |
| 4,123,308 | 10/1978 | Nowlin et al. | 156/272 |
| 4,188,426 | 2/1980 | Auerbach | 427/40 |
| 4,266,999 | 5/1981 | Baier | 427/40 |
| 4,366,184 | 12/1982 | Auerbach et al. | 427/41 |
| 4,421,843 | 12/1983 | Hattori et al. | 427/41 |
| 4,551,778 | 11/1985 | Arai et al. | 427/41 |
| 4,568,563 | 2/1986 | Jackson et al. | 427/40 |
| 4,632,842 | 12/1986 | Karwoski et al. | 427/2 |
| 4,656,083 | 4/1987 | Hoffman et al. | 427/41 |
| 4,673,589 | 6/1987 | Standley | 427/41 |
| 4,692,347 | 9/1987 | Yasuda | 427/40 |
| 4,693,927 | 9/1987 | Nishikawa et al. | 428/216 |
| 4,718,907 | 1/1988 | Karwoski et al. | 427/40 |
| 4,921,723 | 5/1990 | Nichols et al. | 427/41 |
| 4,948,628 | 8/1990 | Montgomery et al. | 427/238 |
| 5,034,265 | 7/1991 | Hoffman et al. | 427/40 |

FOREIGN PATENT DOCUMENTS 122529 10/1977 Japan.

OTHER PUBLICATIONS

Nichols et al., "The Effect of High Energy 'Electrodeless' Plasma Polymerized Methane Polymers on the Adhesion Characteristics of Poly-p-xylylene films," *J. Adhes. Sci. Tech.* vol. 2, No. 1 (1988) Feb.

Sharma and Yasuda, "Effect of Glow Discharge Treatment of Substrates on Parylene-substrate Adhesion," *J. Vac. Sci. Tech.* 21(4) Nov./Dec. 1982.

Sharma and Yasuda, "Effect of Surface Energetics of Substrates on Adhesion Characteristics of Poly-p-xylylenes," *J. Adhesion*, 13, 201 (1982) no month.

*Primary Examiner*—Marianne Padgett
*Attorney, Agent, or Firm*—Senniger, Powers, Leavitt & Roedel

[57] ABSTRACT

A method for plasma treatment of a predetermined portion of a substrate. The impedance of the coil and an established normal plasma is matched with the impedance of a power source, thereby maximizing the efficiency of the transfer of energy from the power source to the coil and producing a resonant plasma. The predetermined portion of the substrate is exposed to the resonant plasma for treatment. Additionally, a method for plasma treatment of a predetermined portion of the outside surface of a filament. The filament is trained through an inlet and exit of a plasma treatment chamber, through an inlet side tubular mask within the chamber, and through an exit side tubular mask within the chamber, each mask being adjustable within the chamber axially of the filament to expose a predetermined segment of the filament to plasma in the chamber while masking the remainder of the filament within the chamber from exposure to plasma. The predetermined segment is subjected to plasma treatment by establishing a plasma within the chamber which contacts the filament. Additionally, an apparatus adapted for carrying out the foregoing methods and a dielectric catheter produced by the foregoing methods.

16 Claims, 5 Drawing Sheets

ADAPTED FROM
SWR CALCULATOR FOUND IN
L-4B INSTRUCTION MANUAL
R.L. DRAKE CO.

5,254,372

METHOD AND APPARATUS FOR PLASMA TREATMENT OF A FILAMENT

BACKGROUND OF THE INVENTION

The present invention relates to an apparatus and method for the plasma treatment of a substrate and more particularly to a method and apparatus for the selective plasma treatment of isolated portions of a filament.

It is critical that catheters for balloon angioplasty, other cardiovascular or other. non-cardiovascular procedures have an absolutely secure bond between the catheter tube and the balloon. The same is true with regard to other devices which may be attached to the tube, such as EKG electrodes, sensors of ions, pressure, temperature, oxygen and/or carbon dioxide concentrations, blood flow and the like. The attachment of the balloon or other device is typically achieved by use of an epoxy resin which bonds the device to the outside of the catheter filament. Such devices often do not bond well to common catheter filament materials such as polyethylene, Teflon ®, silicone, polyurethane and the like. Inadequate bonding between the catheter and the attached instrument can result in detachment and release of the instrument into the blood stream of the patient, which can, in turn, interfere with its operation and possibly result in serious injury or death.

Adhesion of balloons and other devices to the surface of the catheter filament may be improved by plasma etching prior to attachment with epoxy resin. However, such treatment also increases the affinity of the entire surface of the catheter for blood platelets and the like. Adherence of blood platelets to the catheter filament can block the flow of blood around or through the catheter It is important, therefore, to improve the adhesion characteristics of the catheter where the instrument is attached without increasing the platelet affinity of those other areas of the catheter filament surface (interior and exterior) that will be exposed to the blood.

Some devices attached to catheter filaments may occupy the entire circumference of the catheter filament at a given location and thus are bonded along the entire circumference In this instance, it is desirable to provide maximum adhesion characteristics for a predetermined segment of the filament. the segment comprising the entire circumference of the catheter filament along a particular length of the filament. Other devices occupy less than the entire circumference of the filament. In the latter case, it is preferable to enhance adhesion characteristics only for that lesser portion of the filament surface to which the device is attached.

The hollow interiors of catheters are sometimes used to transport blood during angioplasty. Thus, it may also be important to avoid increasing the platelet affinity of the interior surface of the catheter. It also may be desirable to provide a surface treatment to the interior surface of the catheter. Some catheters may comprise multiple interior passages or cavities For these multi-barrel catheters, it may be desirable to provide surface treatment to one or more interior passages while preventing the surface treatment of one or more other interior passages.

Of methods heretofore available for improving the adhesion characteristics of filament surfaces, none are wholly satisfactory for catheter applications. These methods for the most part are slow and awkward, require extensive preparation of the workpiece, or yield results which are not highly reproducible. These procedures undesirably rely upon the operator's training and dexterity and are vulnerable to operator fatigue.

One such method involves etching of the filament surface with the corona of a high voltage electrical conductor. This technique, however, is imprecise due to the lack of operator control over the arc between the electrode and the workpiece, as well as to the presence of gaseous species at the workpiece surface. This method is also limited by the operator's inability to use precise concentrations of gases to improve bonding sites. It is therefore difficult to chemically treat a precise and predetermined portion of the filament surface.

Mechanical and chemical etching techniques are likewise imprecise. Chemical etching processes employ toxic chemicals which are hazardous to operators and to the environment, are very non-selective, require burdensome piecewise masking of those filament regions which are not to be treated prior to application of the etchant, and require burdensome manual removal of masking mechanisms.

Accordingly, a need has existed for a method of selectively improving the adhesion characteristics of predetermined portions of a catheter filament surface, the method being environmentally safe, reproducible and less labor-intensive than currently used methods.

SUMMARY OF THE INVENTION

Among the several objects of the invention, therefore, is the provision of a novel method for improving the adhesion characteristics of predetermined portions of a filament surface; the provision of such a method which selectively treats a predetermined segment of a filament surface where the predetermined segment occupies the entire circumference of the filament along a predetermined length of the filament; the provision of such a method which selectively treats a predetermined portion of a filament surface where the predetermined portion occupies less than the entire circumference of the filament; the provision of such a method which selectively treats a predetermined portion of a filament surface without affecting the adhesion characteristics of the filament surface outside the predetermined portion; the provision of such a method which can be accomplished without altering the adhesion characteristics of the interior surface of the filament in situations where the filament is hollow; the provision of such a method which allows for the differential treatment of a predetermined portion occupying less than the entire circumference of the filament surface, a predetermined segment occupying the entire circumference of the filament along a predetermined length, the external filament surface outside the predetermined portions and segments, and the interior surface of the hollow filament, all as part of a single process; the provision of such a method which allows for the differential surface treatment of the different cavities of a multi-barrel catheter filament; the provision of such a method which does not require extensive preparation of the filament; the provision of such a method which is precise and reproducible; the provision of such a method which does not involve liquid chemical etchants; the provision of a method for producing a balloon catheter which substantially reduces the risk to the patient in angioplasty surgery; the provision of a method for producing a balloon catheter for use in angioplasty surgery characterized by improved adhesion to the catheter of the balloon and other instruments; the provision of an apparatus useful in carrying out the foregoing methods; and, the provision of an angioplasty catheter produced by the foregoing methods.

Briefly, therefore, the present invention is directed to a method for the selective plasma treatment of a predetermined portion of a substrate. The method comprises the steps of establishing a plasma within a plasma treatment chamber by energizing a reactance means with a power source, the reactance means being in electromagnetic coupling relation with the chamber, matching an impedance of a load comprising the reactance means and the plasma with an impedance the power source, thereby maximizing the efficiency of transfer of energy from the power source to the reactance means and producing a resonant plasma, and exposing the predetermined portion of the substrate to the resonant plasma for treatment of the substrate.

The invention is further directed to a method for selective plasma treatment of a predetermined portion of the outside surface of a filament. The method comprises the steps of training the filament through an inlet and an exit means of a plasma treatment chamber, through an inlet side tubular masking means within the chamber, and through an exit side tubular masking means within the chamber. The inlet side and exit side tubular masking means are relatively adjustable within the chamber axially of the filament. The method further comprises adjusting the inlet side and exit side masking means relative to one another to expose a predetermined segment of the filament to plasma in the chamber while masking the remainder of the filament within the chamber from exposure to plasma, and subjecting the predetermined segment of the filament to plasma treatment by establishing a plasma within the chamber which contacts the filament.

The invention is further directed to a method for selective plasma treatment of a predetermined portion of the outside surface of a filament. The method comprises the steps of training the filament through an inlet and an exit means of a plasma treatment chamber and through tubular masking means slidably carried by the inlet means and through exit slidable masking means slidably carried by the exit means, respectively. The method further comprises adjusting the inlet side masking means to mask the filament from exposure to plasma between the inlet means and a predetermined segment of the filament which comprises the predetermined portion and adjusting the exit side masking means to mask the filament from exposure to plasma between the exit means and the segment. The method further comprises interrupting the movement of the filament while subjecting the predetermined portion to plasma treatment by establishing a plasma within the chamber which contacts the filament.

The invention is further directed to an apparatus adapted for plasma treatment of a predetermined portion of the outside surface of a filament having a plastic surface. The apparatus comprises a chamber, an inlet means for introduction of a filament into the chamber, an exit means for passage of the filament out of the chamber, a means for establishing a glow discharge zone within the chamber, an inlet side tubular masking means for masking the filament from exposure to plasma between the inlet means and a predetermined segment of the filament, and an exit side tubular masking means for masking the filament from exposure to plasma between the exit means and the predetermined segment of the filament. The inlet side and exit side tubular masking means are relatively adjustable axially of the filament within the chamber to define a segment of said filament between them for exposure to plasma while masking the remainder of the filament within the chamber from exposure to plasma. The apparatus further comprises sealing means between the filament and the interior of each of the masking means for preventing flow of gas between the surroundings and the chamber along the outside surface of the filament, means for drawing the filament through the chamber, and means for interrupting the movement of the filament to allow isolation and plasma treatment within the chamber of the exterior surface of the predetermined segment of the filament.

The invention is further directed to a dielectric catheter for use in angioplasty procedures which comprises an elongated, flexible, hollow filament. A predetermined portion of the surface of the filament has surface characteristics different than the surface characteristics of the remainder of the filament, the surface characteristics of the predetermined surface portion being created by the exposure of the predetermined portion to a resonant plasma.

Other features and objects of the invention will be in part apparent and in part pointed out hereinafter.

DESCRIPTION OF THE PREFERRED EMBODIMENTS

It has been discovered that the adhesion characteristics of the surface of a substrate, and particularly a hollow filament for use as a catheter, can be substantially improved by plasma treatment of the surface of the filament. This invention employs a plasma treatment and optionally two or more characteristically different plasma treatments to treat different portions of the surface of a filament in preparation for the attachment of instruments to the filament.

A first plasma treatment is used to treat a predetermined portion of the exterior surface of the filament. This predetermined surface portion generally encompasses a very small (approx. 1 mm$^2$) area which occupies less than the entire circumference of the filament. This first plasma treatment may be repeated to affect a number of different portions of the catheter surface where a number of devices are to be attached to the filament.

A second plasma treatment may be used to treat a portion of the filament surface which comprises a predetermined segment occupying the entire circumferential exterior surface of the filament along a predetermined axial length of the filament. The treatment of this predetermined segment is advantageously accomplished without treating the surface of the filament outside the predetermined segment.

It is also a feature of the invention to provide a third treatment to the exterior surface region outside the predetermined portions and a fourth treatment to the interior surface of the hollow filament.

Figure 1:
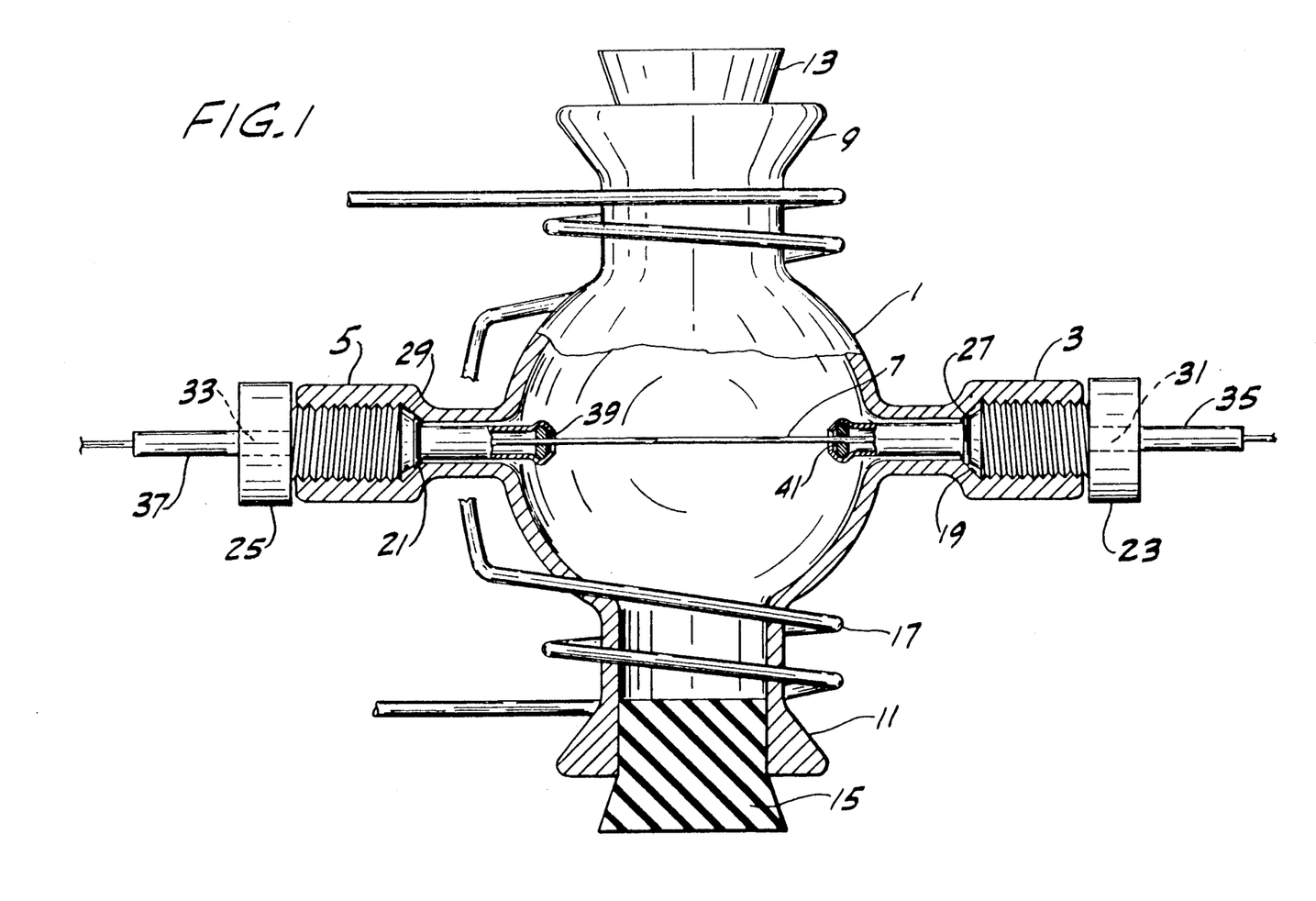
FIG. 1 is an illustration of the apparatus of the invention in partial section.

Illustrated in FIG. 1 is a novel apparatus adapted for carrying out the method of this invention. Reaction chamber 1 is constructed of glass and comprises inlet nozzle 3 and exit nozzle 5 for passage of filament 7 through the reaction chamber 1. Reactance coil 17 is constructed of copper tubing or other suitable material and is wound around reactance chamber 1 such that it produces an electromagnetic field within the chamber when alternating current is passed through the tubing. Filament 7 is constructed of an appropriate catheter material such as polyethylene, polyurethane, silicone, Teflon ® or the like. Access ports 9 and 11 provide access to the reaction chamber for maintenance or the like, and are sealed with rubber stoppers 13 and 15.

Figure 2:
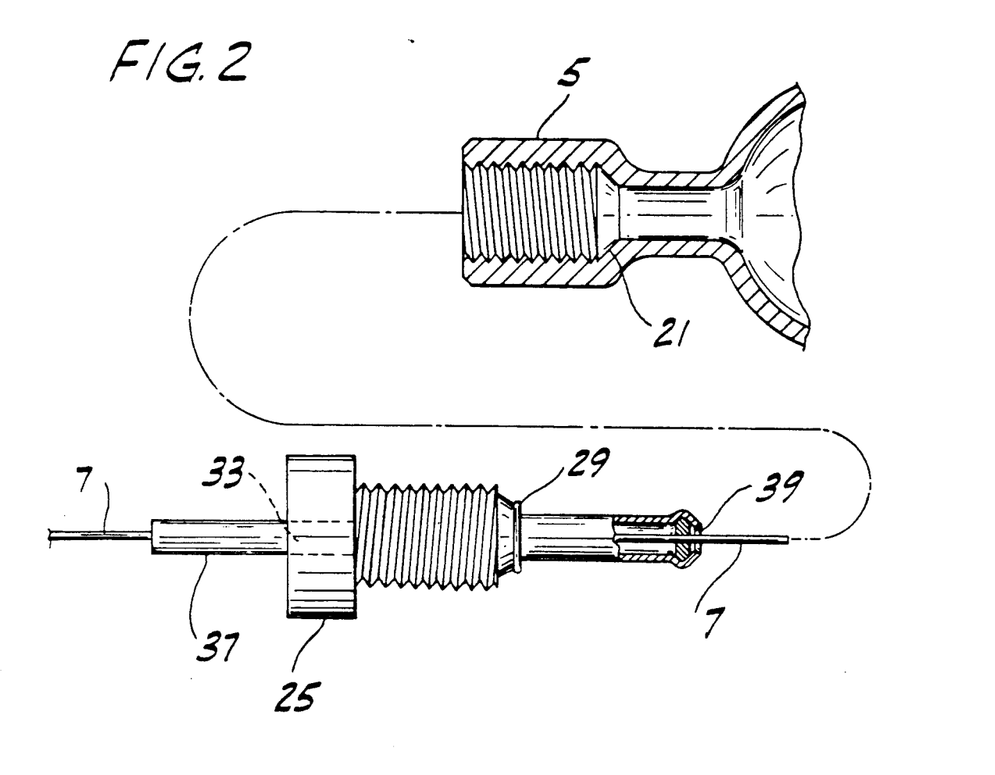
FIG. 2 is an illustration of the bushing and masking tube of the apparatus of FIG. 1.

Each of nozzles 3 and 5 reduces to a shoulder 19, 21 near or adjacent to the external wall of reaction chamber 1. Nozzles 3 and 5 are tapped for receipt of a bushing, indicated at 23 and 25 respectively. The detailed construction of bushing 23, 25 and related assembly is illustrated in FIG. 2. An O-Ring 27, 29 is positioned between the inward tip of bushing 23, 25 and shoulder 19, 21 to provide a seal against flow of gas between the surroundings and the inside of the chamber. Each bushing further has a central bore 31, 33 for receiving a glass masking tube 35, 37.

Glass masking tubes 35 and 37 serve as tubular masking means for masking a segment of the filament from exposure to the plasma within the chamber. Each masking tube 35, 37 is slidable within the nozzle 3, 5, bore 31, 33 and O-ring 27, 29, and extends from outside the bushing 23, 25, through the central bore 31, 33, through the O-ring 27, 29, and into the interior of reaction chamber 1. O-Rings 27, 29 prevent flow of gas between the surroundings and the interior of chamber 1 through the threaded connection between bushings 23, 25 and nozzles 3, 5, and along the outside surfaces of masking tubes 35, 37.

Filament 7 is received within glass masking tubes 35, 37 and extends from outside tube 35 into the interior of the reaction chamber and out of the reaction chamber through tube 37. An inner O-ring 39, 41 is located at the inward end of each tube 35, 37 and seals the filament within the tube, thus allowing for passage therethrough of filament 7 while preventing any flow of gas between the interior of reaction chamber 1 and the interior of masking tubes 35, 37 along the outside surface of filament 7. It thus prevents flow of gas between the surroundings and the chamber along the outside surface of the filament.

To enhance sealing characteristics, each of O-rings 39, 41 is so configured that deformation caused by the normally positive pressure differential between the outer and inner side of the O-ring causes the O-ring to bear more tightly against both the outside of the filament and the inside of the masking tube.

Masking tubes 35 and 37 are slidable and thus the segment of filament 7 which is exposed to the atmosphere within chamber 1 between masking tubes 35, 37 is adjustable by inward or outward sliding of one or both of the masking tubes.

Not shown are nozzles extending from reaction chamber 1 which allow for communication of the interior of the chamber with evacuation means, pressure gauge and means for introduction of a gas into the chamber.

In order to optionally provide an isolated predetermined atmosphere within one or both of the masking tubes 35, 37, they may optionally be sealed at the chamber-remote ends by means of O-rings which are not shown in the figures, but are generally similar to O-rings 39 and 41. Evacuation means, pressure gauge and means for introduction of a gas into each masking tube are also optionally provided.

Figure 5:
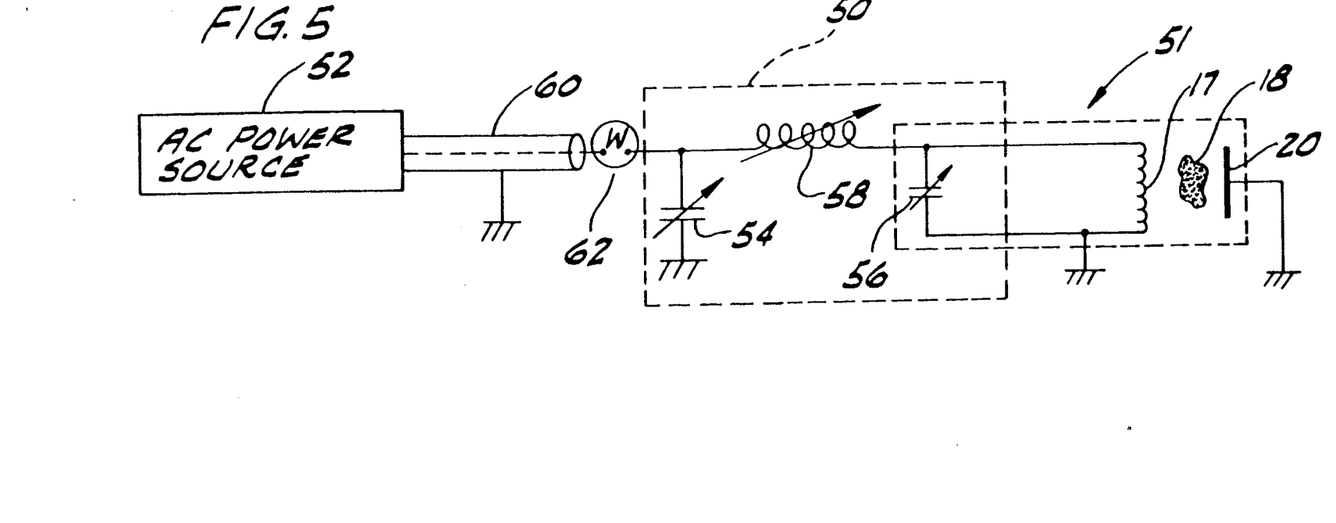
FIG. 5 is a schematic diagram of the circuit for generating the electromagnetic field which establishes the glow discharge zone within a chamber according to the invention.

Reactance coil 17 is wound around the outside of reaction chamber 1 and produces an electromagnetic field within the chamber. Referring to FIG. 5, the circuitry for energizing the reactance coil 17 is illustrated in schematic form. A tuning network 50 provides means for tuning of the impedance of the load comprising reactance coil 17 so that a power transfer is achieved which is sufficient to establish a normal plasma in the chamber. Tuning network 50 also provides means for tuning of the impedance of the load comprising reactance coil 17 and plasma 18 so that it matches the impedance of an AC power source 52 providing power during operation. By thus matching the impedance of the power source with that of the load, the reflection of power is minimized and the efficiency energy transfer is maximized.

The reactance coil 17, plasma 18 and variable capacitor 56 form circuit 51 which oscillates to energize the coil 17 and create an electromagnetic field in magnetic coupling relation to the chamber 1. The electromagnetic field essentially surrounds the workpiece and excites the gas, causing it to ionize and form the plasma 18. Ground 20 is located near the plasma and is preferably in communication with the plasma. For example, ground 20 would be a pair of grounded aluminum plates not shown in the figures which, in combination with suitable O-rings, would replace rubber stoppers 13, 15 shown in FIG. 1. Ground 20 shown in FIG. 5 may also be a grounded structure which communicates with the plasma by means of nozzles 3, 5 or by means of the nozzles not shown which provide for communication with the chamber of evacuation means, pressure gauge or gas introduction means. Tuning network 50 is positioned between and interconnects the AC power source 52 and the circuit 51.

In one preferred embodiment according to the invention, the tuning network 50 comprises a pi tuning network having three components, two of which are connected in parallel with each other and a third component connected between the two parallel components. In particular, variable capacitors 54 and 56 are connected in parallel with ground potential and variable inductor 58 is connected in series between the parallel branches. The AC power source 52 is connected via coaxial cable 60 to the input of wattmeter 62, such as a unit supplied by the R.L. Drake Co., which is connected to the tuning network 50.

During operation, the inductive and/or capacitive values of the components 54, 56, 58 of the tuning network 50 may be adjusted so that the impedance of the load comprising the coil and plasma approximately matches the impedance of the AC power source 52. Characteristically different plasmas result depending on whether or not the practice of the invention includes this impedance matching. Application of impedance matching to a normal plasma by use of this tuning network results in a high energy resonant plasma. Although the tuning network is illustrated with three variable components, it is contemplated that only one or two of the components may be variable. Preferably, variable capacitor 56 forms a part of both the tuning circuit 50 and circuit 51 thereby minimizing component requirements and providing a single component which controls both the tuning of the tuning network 50 and the resonance of circuit 51.

In accordance with the method of the invention, filament 7 is positioned for treatment by training it into reaction chamber 1 through masking tube 35, carried by bushing 23 in inlet nozzle 3, out of the chamber through masking tube 37, carried by bushing 25 in exit nozzle 5, so that the filament extends through the entire assembly from one side to the other. With the filament 7 extending through the reaction chamber 1, masking tubes 35 and 37 are slidably adjusted such that only a segment of filament 7 which comprises the predetermined portion to be treated is exposed to the specific atmosphere created within the chamber.

Not shown are suitable means for drawing the filament through the chamber and a means for interrupting the movement of the filament to allow isolation and plasma treatment of a predetermined portion of the filament.

The interior of chamber 1 with the filament positioned therethrough is evacuated by evacuation means not shown. Oxygen, argon, a low molecular weight monomer or other desired gas is then admitted to the reaction chamber at a flow rate in the range of about 0.25 to 14.50 standard cc/min. by an appropriate inlet means not shown in FIG. 1. The resulting pressure in the chamber interior is typically in the range of about 50 mtorr to 500 mtorr. Sufficient AC power is applied to reactance coil 17 so as to produce a plasma within chamber 1 of the species admitted. To produce this normal plasma, it also may be necessary to adjust tuning network 50 to a certain degree to establish a plasma within chamber 1. Power input may vary widely but is typically in the range of about 50 to 350 watts or greater. One particular application of the method of this invention involved argon gas flow rate of 1.45 standard cc/min., chamber pressure of 150 mtorr, and power input of 100 watts. Another application of the method of this invention involved methane gas flow rate of 0.28 standard cc/min., chamber pressure of 95 mtorr, and power input of 200 watts.

Once a stabilized plasma is established at a constant radio frequency, the impedance of the load comprising reactance coil 17 and plasma 18 is tuned by means of tuning network 50 such that the impedance of the load matches the impedance of AC power source 52. The goal of this tuning or focusing procedure is to minimize reflected power, maximize efficiency and obtain a plasma of the highest intensity possible. This tuning of the impedance of the load therefore produces a high energy resonant first plasma because it maximizes energy transfer from the source 52 to the coil 17 and plasma 18.

Figure 6:
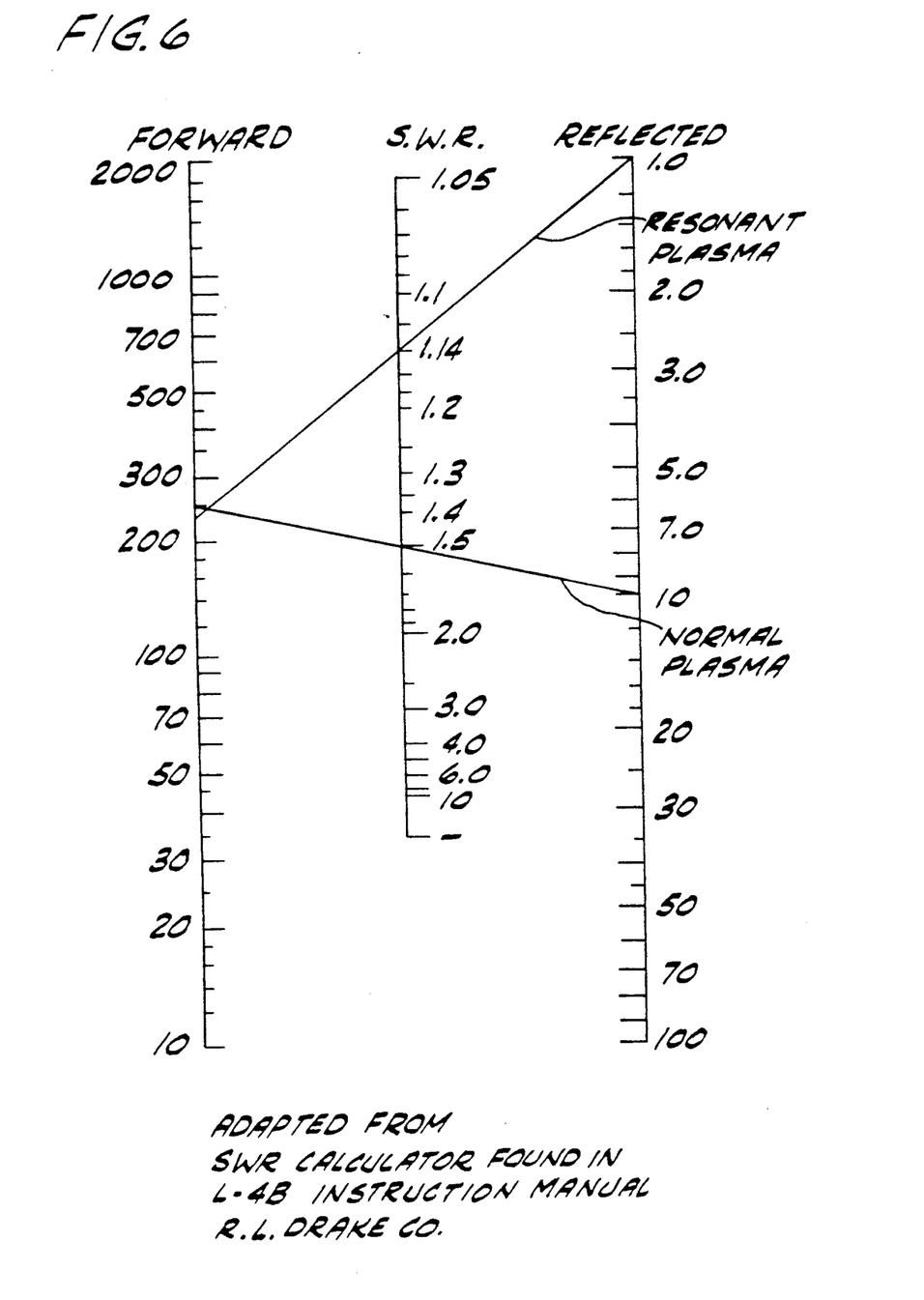
FIG. 6 illustrates a normalized standing wave ratio (SWR) nomograph for determining a SWR for a normal plasma and a resonant plasma created under one set of conditions.
Figure 7:
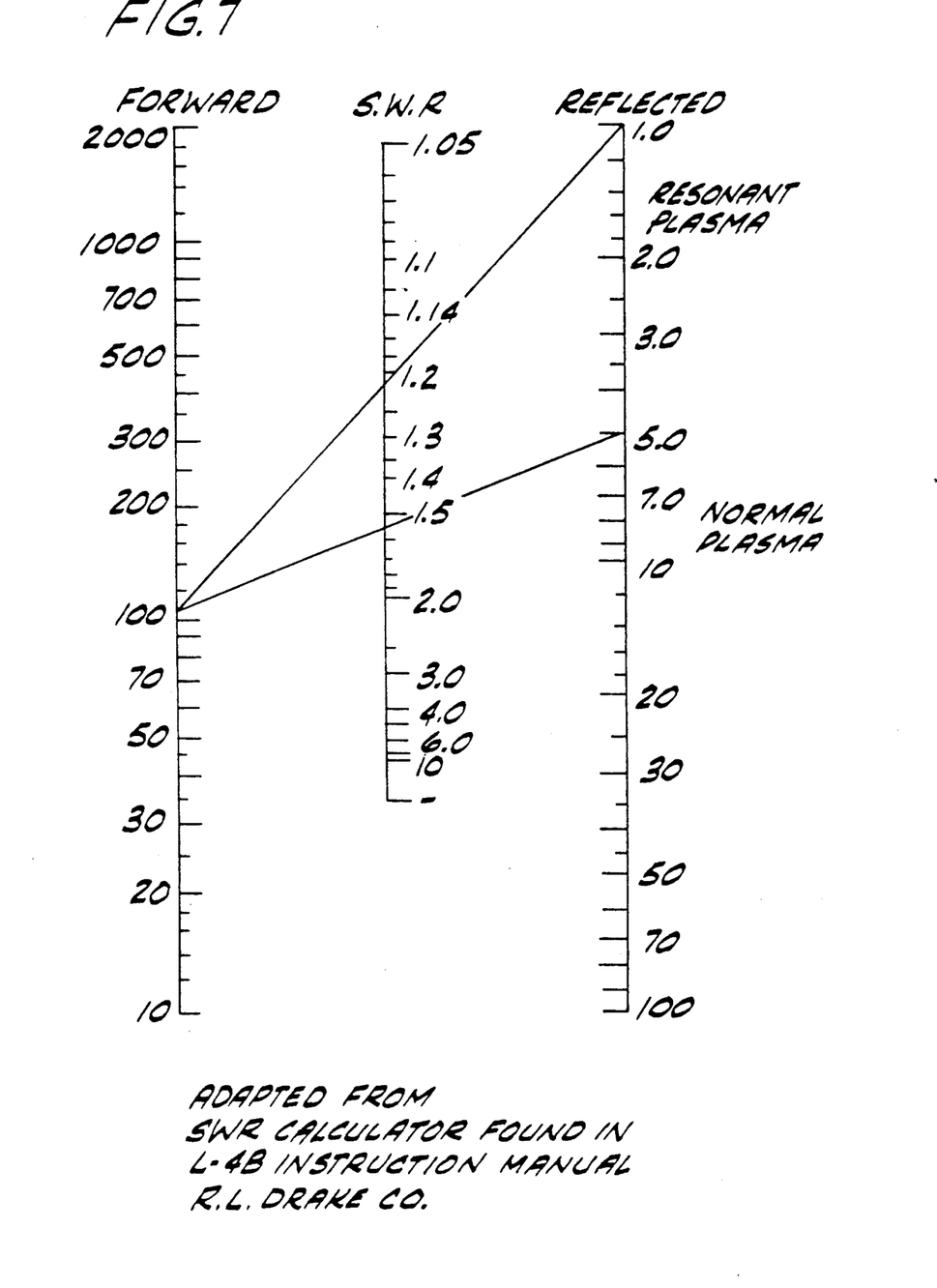
FIG. 7 illustrates a normalized standing wave ratio (SWR) nomograph for determining a SWR for a normal plasma and a resonant plasma created under a second set of conditions.

Turning now to FIG. 6, the standing wave ratio (SWR) of a normal plasma is contrasted with the SWR of a resonant plasma, which is produced by subjecting the normal plasma to the impedance matching procedure as described immediately above. A wattmeter 62, such as a unit supplied by the R. L. Drake Co. (shown in FIG. 5), is adapted to measure the forward power transmitted from the power source 52 or the power reflected from circuit 51. These two power readings are plotted on each of their respective scales shown in FIG. 6 and provide a SWR value on the central nomograph shown in FIG. 6. The tuning of the impedance of the load and resulting reduction in reflected power results in a decrease in the SWR. As determined by the relationship between the reflected power and the forward power, a SWR of about 1.4 to 1.6 is typical for a normal plasma and a SWR of about 1.1 to 1.4 is typical for a resonant plasma. Minimization of the reflected power by impedance matching to the extent that the SWR of a normal plasma is decreased has been found to correspond to the transformation of a normal plasma into the resonant plasma utilized by the first plasma treatment of this invention. The normal plasma line of FIG. 6 represents forward power of 250 watts and reflected power having a normalized reflected power of 10.0 watts, thereby yielding a normalized SWR of 1.5. Similarly, the resonant plasma line of FIG. 6 represents forward power of 250 watts and reflected power having a normalized reflected power of 1 watt yielding a normalized SWR of 1.14. Therefore, a decrease in SWR of 0.26 occurs when this particular normal plasma is tuned by impedance matching according to the method of this invention. FIG. 7 illustrates the calculation of a standing wave ratios for resonant and normal plasmas created under a set of conditions different than those of FIG. 6. Because normal plasmas may be created under various combinations of values for power, gas flow rate, chamber pressure, chamber dimension etc., there is no one particular value for change in SWR which is characteristic of transformation of a normal plasma to a resonant plasma according to this invention; but, a difference of SWR of at least about 0.2 is thought to correspond to the difference between a normal plasma and a resonant plasma created under substantially the same conditions.

The first plasma treatment, which is used to treat a predetermined surface portion of the filament, utilizes the high energy, concentrated, resonant and focused plasma which results from the tuning described above. This plasma is funnel-shaped and characterized by a bright, white, glow, believed to be due to the presence of light energy in the high energy ultraviolet range. This plasma treatment is appropriate for treating small, localized portions of the surface of the workpiece. Though larger areas could be treated, the typical surface area treated by this first plasma treatment is typically about one square millimeter. This focused hot plasma provides a unique treatment in a matter of seconds to the surface of the workpiece. By comparison a normal or cool plasma requires significantly longer periods of exposure before it improves the adhesion characteristics of a filament surface.

This focused hot plasma treats the surface of the workpiece which is positioned in a line along the axis of the central channel of the funnel-shaped plasma in the direction of the convergence of the funnel. The focused hot resonant plasma therefore appears to provide unidirectional treatment. In contrast a normal or cool plasma affects the entire surface of a workpiece which is exposed to the plasma.

Figure 3:
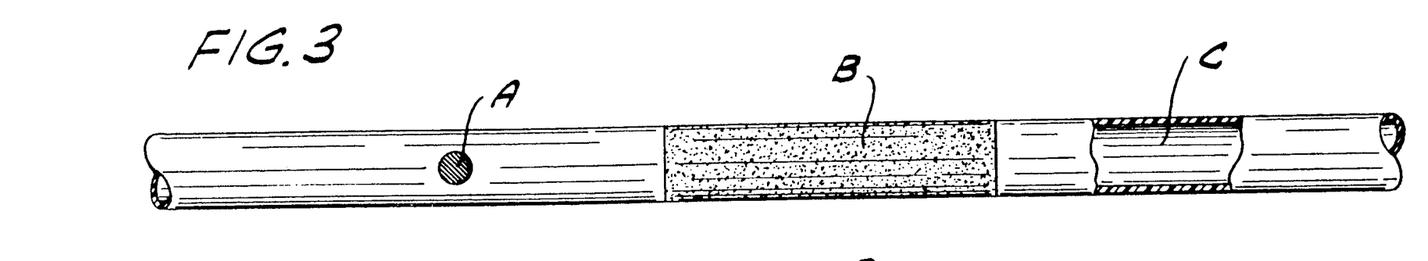
FIG. 3 is an illustration of a segment of a catheter treated according to this invention.
Figure 4:
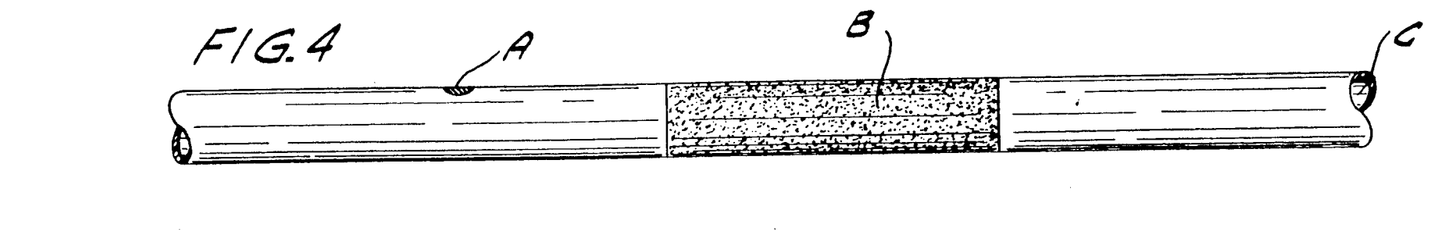
FIG. 4 is an illustration the catheter segment shown in FIG. 3 rotated 90° about its longitudinal axis.

This ability to provide such localized treatment is desirable for applications such as catheters where it is important to avoid treatment of surface areas other than a small predetermined portion. In particular this localized treatment is appropriate for enhancing the adhesion characteristics at, for example, a point on the top of a catheter filament where a small sensor or other instrument is to be attached. Area A in FIGS. 3 and 4 depicts a typical area of a filament which has been treated by this method. An instrument such as an ultrasonic crystal for determining flow rate may subsequently be attached to the filament at area A by means of an adhesive such as an epoxy resin.

The highly intense nature of this first plasma treatment results in rapid high temperature treatment of the workpiece and therefore exposure times are generally on the order of one to five seconds. The reduced exposure time is also an important factor in the ability to avoid treatment of surfaces outside the predetermined location. In any event, exposure periods must be carefully controlled, dependent on the melting point of the workpiece material, the efficiency of energy transfer obtained and the power input, because the plasma utilized in this treatment is highly concentrated and markedly hotter than a normal plasma and therefore overexposure may damage the workpiece.

The surface treatment which results at the predetermined location primarily comprises localized activation of species, free radical generation and chemical processes such as oxidation. Where a glow discharge monomer such as methane is used, deposition of a thin coating containing free radicals may also result (See U.S. Pat. No. 4,921,723). Sequential treatment of the predetermined location with different combinations of plasmas of argon, oxygen and a low molecular weight glow discharge monomer may be desirable to promote adhesion. It has been discovered that treatment of the surface with an argon plasma or with an oxygen plasma significantly improves the adhesion characteristics of the filament. Treatment with a glow discharge monomer such as methane also results in improvement of the adhesion characteristics of the filament.

As a variation to the process for treating a localized spot, the workpiece may be moved relative to the plasma during treatment, thus increasing the surface area of the workpiece which receives the localized plasma treatment. The workpiece may therefore be moved in any of a variety of directions along x, y and z axes relative to the plasma by industrially known remote means. In Particular, where the workpiece is a filament, it may be rotated and/or axially trained through the chamber.

Upon completion of the above localized treatment procedure, a second plasma treatment may optionally be carried out if it is desirable to additionally treat a segment which is defined by the entire circumference of the filament along a predetermined length of the filament. With the filament 7 extending through the reaction chamber 1, masking tubes 35 and 37 are slidably adjusted such that only the segment of filament 7 which is to receive surface treatment is exposed to the atmosphere within the chamber.

The interior of chamber 1 is evacuated by evacuation means not shown. Oxygen, argon, a low molecular weight monomer or other desired gas is then admitted to the reaction chamber at a flow rate in the range of about 0.25 to 14.50 standard cc/min. by an appropriate inlet means not shown in FIG. 1. The resulting pressure in the chamber interior is typically in the range of about 10 mtorr to 1000 mtorr.

AC power is applied to reactance coil 17 sufficient to produce a plasma within chamber 1 of the species admitted. Power input may vary widely but may typically be in the range of 50 to 350 watts or greater. This second plasma treatment utilizes a normal or cool plasma, which is characterized by a dull glow and does not provide selective unidirectional treatment. This plasma treatment is therefore appropriate for treatment of a segment of the filament defined by the entire circumferential surface of a filament along the length of the filament which is exposed to the plasma. This second plasma treatment is especially appropriate for enhancing the adhesion characteristics at, for example, a segment of about 7 to 15 mm. in length where an instrument such as a balloon is to be attached around the entire circumference of the catheter. The second plasma is not resonant nor deliberately focused by the use of impedance matching as described above in connection with the first plasma treatment. Because the second plasma treatment does not utilize a highly concentrated resonant plasma, significantly longer exposure times, typically in the range of 5 to 60 minutes or longer, are required to adequately treat the workpiece.

The second plasma treatment treats the entire workpiece to which it is exposed. It is, therefore, necessary to mask that part of the workpiece which is not to receive the surface treatment provided by this plasma treatment. As noted above, this shielding is accomplished by the provision of two masking tubes 35 and 37 which slidably extend toward the center of the chamber and confine the filament. The tubes do not extend so far into the chamber, however, to completely confine the filament. The segment of the filament 7 which is to receive plasma treatment is positioned between the inward ends of the masking tubes, generally in the central portion of the chamber. In other words, the inlet side masking tube masks the filament from exposure to plasma between the filament inlet means and one end of the segment to be treated. The exit side masking tube masks the filament between the filament exit means and the other end of the segment to be treated.

At the tube ends closest to the center of the chamber are O-rings 39 and 41 which prevent the exchange of atmosphere between each of the tubes and the chamber while allowing for the extension of the filament out of each of the tubes and into the interior of the chamber. In this manner the segment of the filament which is to receive the plasma treatment in the chamber is isolated from the portions of the filament located on each side of that predetermined segment. Segment B in FIGS. 3 and 4 depicts the surface of the catheter which has received this second plasma treatment. The outer edges of segment B correspond to the location of O-rings 39 and 41 during exposure of the filament to the plasma. The length of segment B is therefore a function of the inward-most position of tubes 35 and 37 during treatment.

Each of these masking tubes, in addition to shielding portions of the filament from the atmosphere within the reaction chamber, also allows particular surface characteristics to be imparted to that portion of the filament within each of the tubes. In one application, the tubes serve simply to prevent alteration of surface characteristics of the filament. In this case, the interiors of these masking tubes are kept at a sufficient pressure, typically atmospheric pressure, in order to prevent the formation of a plasma therein.

In another application, oxygen, argon, a glow discharge monomer or the like may be admitted into one or both of these tubes. Sealing means at the outer ends of tubes 35 and 37 and means for admitting a gas therein may be provided where it is desirable to provide a plasma treatment to the portion of the filament within tubes 35 and 37. A plasma may be formed in one tube, both tubes or neither tube upon the supplying of power to the coil which produces the plasma in the chamber. It is therefore possible to, for example, deposit a glow discharge polymer onto the portion of the filament which is within one or both of the masking tubes.

During treatment of the surface of a catheter filament which is typically a hollow tube, the atmosphere in the interior of the catheter tube is normally maintained at atmospheric pressure or at least a pressure sufficient to prevent the formation of a plasma therein. This is accomplished by leaving open the ends of the tubular filament which extend out either side of the apparatus. It is also possible to cause another gas to be admitted into the tubular filament under conditions such that no plasma is formed inside the hollow filament. The purpose of preventing the formation of plasma inside the catheter tube is to prevent improving the adhesion of the interior surface which would tend to promote clotting of blood platelets. This is desirable where the filament interior is to be used to transport blood or other fluids.

It is possible, however, to maintain an environment inside the filament which does result in the formation of a plasma inside the filament upon the supply of power to the reactance means. For some catheter applications it may be desirable to coat the interior of the catheter, surface C in FIGS. 3 and 4, with, for example, a thin polymeric non-thrombogenic coating. This could be accomplished by evacuation of the interior of the filament and introduction therein of a gas at low pressure which forms a glow discharge polymer when power is applied to the reactance means. This may be accomplished either during the localized, high energy, resonant first plasma treatment, or, more preferably, during the second plasma treatment involving a normal or cool plasma.

In applications of the method of this invention to the treatment of multi-barrel catheters, it is possible to differentially treat the separate interior cavities or passages of the catheter by the selective evacuation of each cavity and introduction of a gas therein at a low pressure which forms a plasma when power is applied to the reactance means. Cavities which are not to be treated are maintained in a condition so as to prevent formation of plasma therein as described immediately above.

As various changes could be made in the above methods, apparatus and products without departing from the scope of the invention, it is intended that all matter contained in the above description or shown in the accompanying drawings shall be interpreted as illustrative and not in a limiting sense.

What is claimed is:

1. A method for selective plasma treatment of a portion of the outside surface of a filament, the method comprising the steps of:

training said filament through inlet and exit means of a plasma treatment chamber, through an inlet side tubular masking means within said chamber, and through an exit side tubular masking means within said chamber, said inlet side and exit side tubular masking means being adjustable relative to one another, axially of said filament, adjusting said inlet side and exit side masking means relative to one another to expose a portion of said filament to plasma in said chamber while masking the remainder of the filament within the chamber from exposure to plasma, and subjecting said portion to plasma treatment by establishing a plasma within said chamber which contacts said filament.

2. A method as set forth in claim 1 wherein the establishment of said plasma comprises energizing a coil with a power source, said coil being in electromagnetic coupling relation with said chamber.

3. A method as set forth in claim 1 wherein said plasma comprises oxygen, argon or a low molecular weight monomer.

4. A method as set forth in claim 3 wherein said plasma comprises a monomer selected from the group consisting of methane, ethane, propane and butane.

5. A method as set forth in claim 1 comprising the additional steps of:

terminating said plasma treatment;

adjusting said inlet side masking means and said exit side masking means to expose a second portion of said filament to an atmosphere within said chamber; and subjecting said second portion to plasma treatment by establishing a plasma with said chamber.

6. A method as set forth in claim 1 wherein said filament comprises a longitudinal interior passage, the method comprising the additional step of passing a gas into said passage.

7. A method as set forth in claim 6 comprising the additional step of maintaining said interior passage at a pressure sufficient to prevent formation of a plasma in said passage during plasma treatment of said filament.

8. A method as set forth in claim 7 wherein said interior passage is maintained at approximately atmospheric pressure.

9. A method as set forth in claim 6 wherein said gas forms a plasma upon said establishment of said plasma within said chamber.

10. A method as set forth in claim 1 comprising the additional step of sealing said inlet side masking means and said exit side masking means to prevent the flow of gas between the interior of each of said masking means and the interior of said chamber.

11. A method as set forth in claim 10 wherein said inlet side masking means and said exit side masking means comprise glass tubes.

12. A method as set forth in claim 11 comprising the additional step of passing a gas into the interior of at least one of said inlet side masking means and said exit side masking means.

13. A method as set forth in claim 12 wherein said gas in the interior of at least one of said inlet side masking means and said exit side masking means forms a polymer which is deposited onto said filament upon said establishment of said plasma within said chamber.

14. A method as set forth in claim 11 wherein the interior of at least one of said masking means is maintained at approximately atmospheric pressure during the plasma treatment of said filament.

15. A method as set forth in claim 1 wherein said filament comprises multiple interior passage, the method comprising the additional step of maintaining different atmospheres in each of said passages during the plasma treatment of said filament.

16. A method for selective plasma treatment of a portion of the outside surface of a filament, the method comprising the steps of:

training said filament through inlet means of a plasma treatment chamber, through tubular inlet side masking means which is carried by said inlet means, through exit means of said plasma treatment chamber, and through tubular exit side masking means which is carried by said exit means;

adjusting said inlet side masking means to mask said filament from exposure to plasma between said inlet means and a segment of said filament which comprises said portion;

adjusting said exit side masking means to mask said filament from exposure to plasma between said exit means and said segment; and interrupting the movement of said filament while subjecting said portion to plasma treatment by establishing a plasma within said chamber which contacts said filament.

* * * * *